United States Patent
Koehler et al.

(10) Patent No.: US 8,705,831 B2
(45) Date of Patent: Apr. 22, 2014

(54) SYSTEM AND METHOD FOR GENERATING AN IMAGE OF A REGION OF INTEREST

(75) Inventors: Thomas Koehler, Norderstedt (DE); Roland Proksa, Neu Wulmstorf (DE)

(73) Assignee: Koninklijke Philips N.V., Eindhoven (NL)

( * ) Notice: Subject to any disclaimer, the term of this patent is extended or adjusted under 35 U.S.C. 154(b) by 129 days.

(21) Appl. No.: 13/394,819

(22) PCT Filed: Sep. 21, 2010

(86) PCT No.: PCT/IB2010/054256
§ 371 (c)(1),
(2), (4) Date: Mar. 8, 2012

(87) PCT Pub. No.: WO2011/036624
PCT Pub. Date: Mar. 31, 2011

(65) Prior Publication Data
US 2012/0177274 A1 Jul. 12, 2012

(30) Foreign Application Priority Data
Sep. 24, 2009 (EP) .................................... 09171212

(51) Int. Cl.
*G06K 9/00* (2006.01)
(52) U.S. Cl.
USPC .......................................................... 382/131
(58) Field of Classification Search
None
See application file for complete search history.

(56) References Cited

U.S. PATENT DOCUMENTS

| | | | | |
|---|---|---|---|---|
| 5,402,338 | A * | 3/1995 | Ito | 600/407 |
| 7,526,060 | B2 * | 4/2009 | Ziegler | 378/4 |
| 8,224,021 | B2 * | 7/2012 | Vaidya | 382/100 |
| 2006/0215891 | A1 | 9/2006 | Fessler et al. | |
| 2007/0116343 | A1 | 5/2007 | Sauer et al. | |
| 2010/0124359 | A1* | 5/2010 | Vaidya | 382/103 |
| 2011/0044524 | A1* | 2/2011 | Wang et al. | 382/131 |

FOREIGN PATENT DOCUMENTS

WO 02067201 A1 8/2002

OTHER PUBLICATIONS

Ahn, S., et al.; Convergent Incremental Optimization Transfer Algorithms: Application to Tomography; 2006; IEEE Trans. on Medical Imaging; 25(3)283-296.
Erdogan, H., et al.; Ordered subsets algorithms for transmission tomography; 1999; Phys. Med. Biol.; 44:2835-2851.

(Continued)

*Primary Examiner* — Nancy Bitar (57) ABSTRACT

The invention relates to an image generation system for generating an image of a region of interest. The image generation system comprises a measured data providing unit for providing measured data of the region of interest, a reconstruction unit (12) for reconstructing a first and a second image of the region of interest from the measured data using a first and a second reconstruction method, a noise determination unit (13) for determining first and second noise values for first and second image elements of the first and second image, and an image element combining unit (14) for combining corresponding first and second image elements into combined image elements forming a combined image based on the first and second noise values. By combining corresponding image elements of two differently reconstructed images based on determined noise values, a combined image of a region of interest can be generated with an improved quality.

14 Claims, 5 Drawing Sheets

(56) References Cited

OTHER PUBLICATIONS

Fessler, J. A., et al.; A Paraboloidal Surrogates Algorithm for Convergent Penalized-Likelihood Emission Image Reconstruction; 1999; Proc. of IEEE Nuc. Sci. Symp. Med. Im. Conf.; pp. 1132-1135.

Qi, J., et al.; A Theoretical Study of the Contrast Recovery and Variance of MAP Reconstructions from PET Data; 1999; IEEE Trans. on Medical Imaging; 18(4)293-305.

Shechter, G., et al.; The frequency split method for helical cone-beam reconstruction; 2004; Med. Phys.; 31(8) 2230-2236.

Stayman, J. W., et al.; Efficient Calculation of Resolution and Covariance for Penalized-Likelihood Reconstruction in Fully 3-D SPECT; 2004; IEEE Trans. on Medical Imaging; 23(12)1543-1556.

Stierstorfer, K., et al.; Weighted-FBP—a simple approximate 3D FBP algorithm for multislice spiral CT with good dose usage for arbitrary pitch; 2004; Phys. Med. Biol.; 49:2209-2218.

Wunderlich, A., et al.; Image covariance and lesion detectability in direct fan-beam x-ray computed tomography; 2008; Phys. Med. Biol.; 53:2471-2493.

Zhang-O'Connor, Y., et al.; Fast Predictions of Variance Images for Fan-Beam Transmission Tomography with Quadratic Regularization; 2007; IEEE Trans. on Medical Imaging; 26(3)335-346.

Ziegler, A., et al.; Noise and resolution in images reconstructed with FBP and OSC algorithms for CT; 2007; Med. Phys.; 34(2)585-598.

\* cited by examiner

SYSTEM AND METHOD FOR GENERATING AN IMAGE OF A REGION OF INTEREST

FIELD OF THE INVENTION

The invention relates to an image generation system and an image generation method for generating an image of a region of interest. The invention relates further to a corresponding computer program for generating an image of a region of interest.

BACKGROUND OF THE INVENTION

US 2007/0116343 A1 discloses a method for improving the quality of an image. A first image and a second image of a sample volume are reconstructed by applying one of a filtered backprojection method (FBP) and an iterative reconstruction method (IR), respectively. Based on a heuristic classifier that compares the CT number or Hounsfield Unit (HU) of each image element with a low and a high threshold, the first image is segmented into a soft-tissue region and a bone region with a smooth transition between the two regions. Additional classifiers can optionally be calculated by at least once low pass filtering the classifier used for segmentation. Moreover, if it is determined that the noise in the first image is high, a further additional "scaled down" classifier can optionally be calculated by multiplying an additional, two times low pass filtered classifier with a global scaling factor. One of the one or more classifiers is then used to generate a final image as a weighted average of the first image and the second image.

This generating of the final image has the drawback that the weighted averaging of the first image and the second image based on the provided one or more classifiers may still lead to a generated final image of inferior quality.

SUMMARY OF THE INVENTION

It is an object of the present invention to provide an image generation system for generating an image of a region of interest, which allows generating an image of the region of interest with an improved quality. It is a further object of the present invention to provide a corresponding image generation method and computer program for generating an image of a region of interest.

In a first aspect of the present invention an image generation system for generating an image of a region of interest is presented, wherein the image generation system comprises:
a measured data providing unit for providing measured data of the region of interest for generating an image of the region of interest,
a reconstruction unit for reconstructing a first image of the region of interest from the measured data using a first reconstruction method and a second image of the region of interest from the measured data using a second reconstruction method,
a noise determination unit for determining first noise values for first image elements of the first image and second noise values for second image elements of the second image, and
an image element combining unit for combining the first image elements and the second image elements into combined image elements forming a combined image, wherein the image element combining unit is adapted to combine a first image element of the first image elements and a corresponding second image element of the second image elements based on the first noise value determined for the first image element and the second noise value determined for the second image element.

The invention is based on the idea that an image of a region of interest may be generated with an improved quality, if image elements of two differently reconstructed images are combined into combined image elements forming a combined image, wherein the combining is based on noise values, which have been determined for corresponding image elements of the two differently reconstructed images. In particular, if the determined noise values are different for corresponding image elements of the two differently reconstructed images, the corresponding image elements can be combined such that, for example, the combined noise values of the combined image elements are reduced compared to the noise values determined for the corresponding image elements. Moreover, the corresponding image elements of the two differently reconstructed images can be combined such that, for example, the combined noise values of the combined image elements result in a more homogeneous visual noise appearance of the combined image. Thus, by suitably combining the two differently reconstructed images based on the determined noise values, a combined image may be generated with an improved quality.

The measured data providing unit can be an imaging modality such as a computed tomography (CT) scanner, a positron emission tomography (PET) scanner, a single positron emission computed tomography (SPECT) scanner, a 3D X-ray scanner, a magnetic resonance imaging (MRI) system, an ultrasound imaging (UI) system, an electrical impedance tomography (EIT) system, an electrical capacitance tomography (ECT) system, a magnetic induction tomography (MIT) system, et cetera. Alternatively, it can also be an interface that is capable of coupling, for example, via a direct link or via a wired or wireless network, to a suitable imaging modality for providing measured data from the imaging modality. In addition or in an alternative, the measured data providing unit can also be an interface that is capable of receiving measured data provided by a suitable imaging modality from a "long-term" storage medium, such as a hard drive, a CD, a DVD, a flash memory card, et cetera.

The first reconstruction method and the second reconstruction method can be different reconstruction methods, for example, the first reconstruction method can be a filtered backprojection method and the second reconstruction method can be an iterative penalized-likelihood method. Alternatively, the first reconstruction method and the second reconstruction method can be identical reconstruction methods, but they may be performed with different parameter settings and/or different pre- and/or post-processing steps. For example, the first reconstruction method and the second reconstruction method can both be iterative penalized-likelihood methods, but they may each incorporate a different 'roughness penalty' for regularizing the reconstruction.

The term "region of interest" as used herein is to be interpreted broadly. For example, it can refer to an object, such as a patient or a technical object, or to a specific part therefrom or it can generally refer to a specific region in space.

The term "image" as used herein preferentially refers to a two-dimensional image or to a three-dimensional, that is, volumetric image. When the image is a two-dimensional image, it can be a part of a time series of two-dimensional images (often called an image sequence or a video) or it can be a part, for example, a slice, of a three-dimensional image, which, in turn, can also be a part of a time series of three-dimensional images (often called a four-dimensional image or three-dimensional image sequence). Alternatively, the term "image" as used herein can also refer to images of higher dimensions, such as multi-spectral or multi-energy images.

The term "image element" as used herein preferentially refers to the smallest constituent of an image, such as a pixel in a two-dimensional image or a voxel in a three-dimensional, that is, volumetric image. Alternatively, the term can also refer to a group of such smallest constituents of an image, such as a group of pixels or a group of voxels.

When it is herein said that two image elements of two different images are "corresponding" image elements, it is therewith expressed that both image elements image substantially the same area of the region of interest. For example, if the two image elements are voxels of two different three-dimensional images, they both relate to substantially the same spatial position within the region of interest. When the two different images are parts of two respective time series of images, the corresponding image elements also relate to the same instant of image at which the region of interest has been imaged.

The first noise values, which are determined for the first image elements, are preferentially noise values that characterize the noise of the first image elements independent of the noise of the second image elements. Likewise, the second noise values, which are determined for the second image elements, are preferentially noise values that characterize the noise of the second image elements independent of the noise of the first image elements.

Preferentially, the noise determination unit is adapted to determine the first noise value for the first image element as a first noise variance of the first image element and the second noise value for the second image element as a second noise variance of the second image element.

In probability theory and statistics, the variance of a random variable is the expected deviation of that variable from its expected mean value. As such, the variance is a statistical measure of how much the random variable is "spread out". Thus, if the measured data of the region of interest can be modeled as random variables following a given probability distribution, for example, a Poisson statistical model, the noise variances of the image elements of a reconstructed image of the region of interest can be determined, providing a 'measure of uncertainty', that is, a statistical measure of how certain a reconstructed image element is and how much it may be corrupted by noise. As a result, by combining the two differently reconstructed images based on noise variances, which are determined for corresponding image elements of the two differently reconstructed images, a combined image may be generated that is more certain and less corrupted by noise.

It is preferred that the noise determination unit is adapted to determine the first noise value for the first image element based on knowledge about the first reconstruction algorithm and the second noise value for the second image element based on knowledge about the second reconstruction algorithm.

When an image of the region of interest is reconstructed from measured data of the region of interest, the particular choice of the reconstruction method plays an important role for the appearance of the noise in the reconstructed image. For example, statistical reconstruction methods, such as an iterative penalized-likelihood method, are known to account for the statistical properties of the measured data during the reconstruction; such methods therefore typically lead to different noise values in the reconstructed image than a filtered backprojection method, which is known to ignore the noise statistics of the measured data.

Thus, by incorporating knowledge about the particular reconstruction method that is used to reconstruct an image of the region of interest, that is, by incorporating knowledge about how the particular reconstruction method processes the measured data in order to reconstruct an image element, a more reliable and accurate determination of the noise values of the image elements of the reconstructed image can be achieved.

Preferentially, the image element combining unit is adapted to combine the first image element and the second image element by performing a weighted averaging, wherein the weighted averaging comprises weighting the first image element with a first weight and weighting the second image element with a second weight, and wherein the first weight and the second weight are dependent on the first noise value and the second noise value. Preferentially, both the first weight and the second weight are dependent on both the first noise value and the second noise value.

It is preferred that the image element combining unit is adapted to choose the first weight and the second weight such that a combined noise value of the combined image element is reduced in comparison to at least one of the first noise value and the second noise value. Preferentially, the first weight and the second weight are chosen such that the combined noise value is smaller than both the first noise value and the second noise value. It is further preferred that the first weight and the second weight are chosen such that the combined noise value is minimized.

In an embodiment, the image element combining unit is adapted to choose the first weight depending on a ratio of a) the second noise value and b) the sum of the first noise value and the second noise value, and the second weight depending on a ratio of a) the first noise value and b) the sum of the first noise value and the second noise value. In particular, it is preferred that the first weight and the second weight are chosen according to following equations:

$$w_1 = \frac{n_2}{n_1+n_2}, \text{ and } w_2 = \frac{n_1}{n_1+n_2},$$

wherein $w_1$ represents the first weight, $w_2$ represents the second weight, $n_1$ represents the first noise value and $n_2$ represents the second noise value.

By performing a weighted averaging and by suitably choosing the first weight and the second weight, the quality of the combined image element can be improved in a simple and efficient way. In particular, if the first weight and the second weight are chosen such that the combined noise value of the combined image element is minimized, the quality of the combined image element can be maximized. As a result, a combined image of the region of interest can be generated with a reduced noise, in particular, a minimized noise, and, thus, an improved quality.

Preferentially, the combined noise value, which is improved by suitably choosing the first weight and the second weight, is a combined noise variance of the combined image element.

It is further preferred that the noise determination unit is further adapted for determining joint third noise values for the first image elements and the second image elements, wherein the image element combining unit is adapted to combine a first image element of the first image elements and a corresponding second image element of the second image elements based on the first noise value determined for the first image element, the second noise value determined for the second image element and the joint third noise value determined for the first image element and the second image element.

The first noise values, which are determined for the first image elements, are preferentially noise values that characterize the noise of the first image elements, independent of the noise of the second image elements. Likewise, the second noise values, which are determined for the second image elements, are preferentially noise values that characterize the noise of the second image elements, independent of the noise of the first image elements. Since the two differently reconstructed images of the region of interest are reconstructed from the same measured data of the region of interest, it can be expected that the noise values of corresponding image elements of the two differently reconstructed images are somewhat related, that is, they somehow exhibit a similar behavior. In this case, it may be advantageous to also determine joint third noise values, which characterize this similarity, for corresponding image elements of the two differently reconstructed images. If the combining of the corresponding image elements into combined image elements is then additionally based on the determined joint third noise values, a further improved combined image may be generated.

Preferentially, the noise determination unit is adapted to determine the joint third noise value for the first image element and the second image element as a joint noise covariance of the first image element and the second image element.

In probability theory and statistics, the covariance of two random variables is a statistical measure of how much the two random variables change together. As such, the covariance provides a 'measure of similarity', that is, a statistical measure of how similar two corresponding image elements of two differently reconstructed images are. As a result, by basing the combining of the two differently reconstructed images additionally on joint noise covariances, which are determined for corresponding image elements of the two differently reconstructed images, a further improved combined image may be generated.

It is preferred that the noise determination unit is adapted to determine the joint third noise value for the first image element and the second image element based on knowledge about the first reconstruction method and the second reconstruction method.

As already mentioned above, when an image of the region of interest is reconstructed from measured data of the region of interest, the particular choice of the reconstruction method plays an important role for the appearance of the noise in the reconstructed image. The same observation also holds true for the joint noise values of two differently reconstructed images. Thus, by incorporating knowledge about the particular reconstruction methods that are used to reconstructed two different images of the region of interest, that is, by incorporating knowledge about how the particular reconstruction methods process the measured data in order to reconstruct corresponding image elements, a more reliable and accurate determination of also the joint noise values of corresponding image elements of the differently reconstructed images can be achieved.

Preferentially, the image element combining unit is adapted to combine the first image element and the second image element by performing a weighted averaging, wherein the weighted averaging comprises weighting the first image element with a first weight and weighting the second image element with a second weight, and wherein the first weight and the second weight are both dependent on the first noise value, the second noise value and the joint third noise value.

Also if the first weight and the second weight are both dependent on the first noise value, the second noise value and the joint third noise value, it is preferred that the image element combining unit is adapted to choose the first weight and the second weight such that a combined noise value of the combined image element is reduced in comparison to at least one of the first noise value and the second noise value. Preferentially, the first weight and the second weight are chosen such that the combined noise value is smaller than both the first noise value and the second noise value. It is further preferred that the first weight and the second weight are chosen such that the combined noise value is minimized.

In an embodiment, the image element combining unit is adapted to choose
the first weight depending on following expression:

$$\frac{n_2 - n_{1,2}}{n_1 - 2n_{1,2} + n_2},$$

and
the second weight depending on following expression:

$$\frac{n_1 - n_{1,2}}{n_1 - 2n_{1,2} + n_2},$$

wherein $n_1$ represents the first noise value, $n_2$ represents the second noise value and $n_{1,2}$ represents the joint third noise value. In particular, it is preferred that the first weight and the second weight are chosen according to following equations:

$$w_1 = \frac{n_2 - n_{1,2}}{n_1 - 2n_{1,2} + n_2}, \text{ and } w_2 = \frac{n_1 - n_{1,2}}{n_1 - 2n_{1,2} + n_2},$$

wherein $w_1$ represents the first weight and $w_2$ represents the second weight. This allows generating a combined image of the region of interest with a reduced noise and, thus, an improved quality.

It is further preferred that the reconstruction unit is adapted such that the first reconstruction method is a filtered backprojection method and the second reconstruction method is an iterative penalized-likelihood method.

It is known that, compared to a filtered backprojection method, an iterative penalized-likelihood method typically leads to lower noise values, in particular, for image elements of homogenous regions of the reconstructed image. On the other hand, it has been found that a filtered backprojection method can actually lead to lower noise values for image elements of high activity regions, such as sharp edges, corners, et cetera, of the reconstructed image. Thus, by combining image elements of two different images of the region of interest, which have been reconstructed using a filtered backprojection method and an iterative penalized-likelihood method, respectively, a combined image may be generated in which the combined image elements are, in each case, predominantly influenced by those image elements of the two differently reconstructed images that are reconstructed with the reconstruction method most suited for the specific region of the combined image.

In a further aspect of the present invention an image generation method for generating an image of a region of interest is presented, wherein the image generation method comprises the following steps:

provide measured data of the region of interest for generating an image of the region of interest, reconstructing a first image of the region of interest from the measured data using a first reconstruction method and a second image of the region of interest from the measured data using a second reconstruction method, determining first noise values for first image elements of the first image and second noise values for second image elements of the second image, and combining the first image elements and the second image elements into combined image elements forming a combined image, wherein a first image element of the first image elements and a corresponding second image element of the second image elements are combined based on the first noise value determined for the first image element and the second noise value determined for the second image element.

In a further aspect of the present invention, a computer program for generating an image of a region of interest is presented, wherein the computer program comprises program code means for causing an image generation system to carry out the steps of the image generation method, when the computer program is run on a computer controlling the image generation system.

It shall be understood that the image generation system, the image generation method and the computer program have similar and/or identical preferred embodiments, in particular, as defined in the dependent claims.

It shall be understood that a preferred embodiment of the invention can also be any combination of the dependent claims with the respective independent claim.

These and other aspects of the invention will be apparent from and elucidated with reference to the embodiments described hereinafter.

DETAILED DESCRIPTION OF EMBODIMENTS

Figure 1:
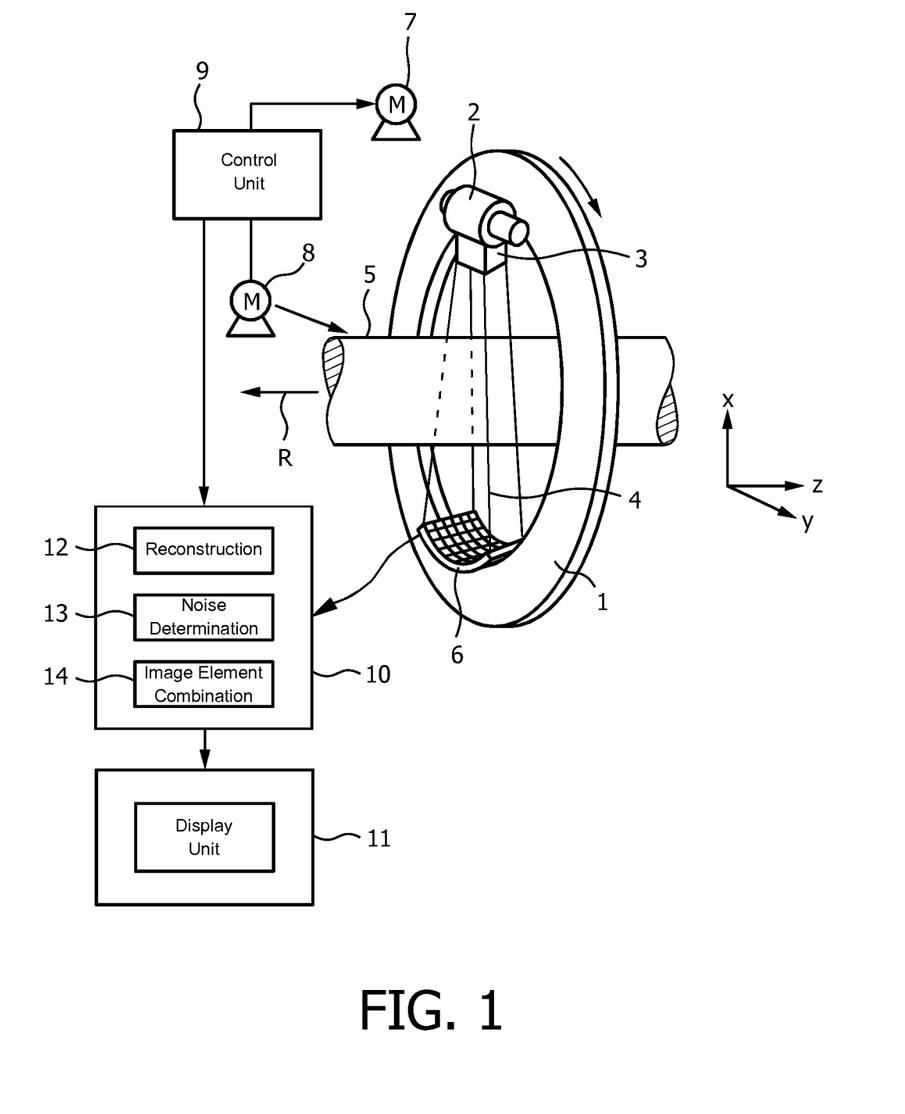
FIG. 1 shows schematically and exemplarily an embodiment of an image generation system for generating an image of a region of interest.

FIG. 1 shows schematically and exemplarily an embodiment of an image generation system for generating an image of a region of interest, the image generation system being, in this embodiment, a computed tomography (CT) system. The computed tomography system comprises a gantry 1, which is capable of rotating around an axis of rotation R, which extends parallel to the z axis. A radiation source 2, for example, an X-ray tube, is mounted on the gantry 1. The radiation source 2 is provided with a collimator 3, which forms, in this embodiment, a conical radiation beam 4 from the radiation emitted by the radiation source 2. In other embodiments, the collimator 3 can be adapted to form a radiation beam having another shape, for example, having a fan shape.

The radiation beam 4 traverses an object (not shown), such as a patient or a technical object, within a region of interest in a cylindrical examination zone 5. After having traversed the region of interest, the radiation beam 4 is incident on a detection device 6 having, in this embodiment, a two-dimensional detection surface. The detection device 6 is mounted on the gantry 1. In other embodiments, the detection device 6 can also have a one-dimensional detection surface.

The gantry 1 is driven at a preferably constant but adjustable angular speed by a motor 7. A further motor 8 is provided for displacing the object, for example, a patient who is arranged on a patient table in the examination zone 5, parallel to the direction of the axis of rotation R or the z axis. These motors 7, 8 are controlled by a control unit 9, for instance, such that the radiation source 2 and the examination zone 5, in particular, the region of interest, move relatively to each other along a helical trajectory. However, it is also possible that the object or the examination zone 5, in particular, the region of interest, is not moved, but that only the radiation source 2 is rotated, that is, that the radiation source 2 moves along a circular trajectory relative to the examination zone 5, in particular, the region of interest.

During the relative movement of the radiation source 2 and the examination zone 5, in particular, the region of interest, the detection device 6 generates measurement values depending on the radiation incident on the detection surface of the detection device 6. Therefore, the radiation source 2, the elements for moving the radiation source 2 relative to the examination zone 5, in particular, the motors 7, 8, the gantry 1, the control unit 9, and the detection device 6 form a measured data providing unit for providing measured data of the region of interest.

The measured data of the region of interest, which are, in this embodiment, measured projection data, are provided to a calculation unit 10 comprising a reconstruction unit 12, a noise determination unit 13 and an image element combining unit 14.

The reconstruction unit 12 is adapted to reconstruct a first image of the region of interest from the measured data using a first reconstruction method and a second image of the region of interest from the measured data using a second reconstruction method. In this embodiment, the reconstruction unit 12 is adapted such that the first reconstruction method is a filtered backprojection method and the second reconstruction method is an iterative penalized-likelihood method.

The noise determination unit 13 is adapted to determine first noise values for first image elements of the first image and second noise values for second image elements of the second image. In this embodiment, the noise determination unit 13 is adapted to determine the first noise value for the first image element as a noise variance of the first image element and the second noise value for the second image element as a noise variance of the second image element. The noise determination unit 13 determines the first noise variance for the first image element based on knowledge about the first reconstruction method, which, in this embodiment, is a filtered backprojection method, and the second noise variance for the second image element based on knowledge about the second reconstruction method, which, in this embodiment, is an iterative penalized-likelihood method.

Optionally, the noise determination unit 13 is adapted to further determine joint third noise values for the first image elements and the second image elements. The noise determination unit 13 can be adapted to determine the joint third noise value for the first image element and the second image element as a joint noise covariance of the first image element and the second image element. The noise determination unit 13 can be adapted to determine the joint noise covariance for the first image element and the second image element based on knowledge about the first reconstruction method, which, in this embodiment, is a filtered backprojection method, and the second reconstruction method, which, in this embodiment, is an iterative penalized-likelihood method.

The image element combining unit 14 combines the first image elements and the second image elements into combined image elements forming a combined image.

In more detail, if the noise determination unit 13 is not adapted to determine a joint noise covariance for the first image element and the second image element, the image element combination unit 14 combines a first image element of the first image elements and a corresponding second image element of the second image elements into a combined image element of the combined image elements by performing a weighted averaging based on the first noise variance determined for the first image element and the second noise variance determined for the second image element. The weighted averaging comprises weighting the first image element with a first weight and weighting the second image element with a second weight, wherein the first weight and the second weight are dependent on the first noise variance and the second noise variance. The image element combining unit 14 chooses the first weight and the second weight such that a combined noise value, in this embodiment, a combined noise variance, of the combined image element is reduced in comparison to at least one of the first noise variance and the second noise variance. A more detailed description of how the weighted averaging is performed for the case where the noise determination unit 13 is not adapted to determine a joint noise covariance for the first image element and the second image element will be given below.

If the noise determination unit 13 is adapted to determine a joint noise covariance for the first image element and the second image element, the image element combination unit 14 combines a first image element of the first image elements and a corresponding second image element of the second image elements into a combined image element of the combined image elements by performing a weighted averaging based on the first noise variance determined for the first image element, the second noise variance determined for the second image element, and the joint noise covariance determined for the first image element and the second image element. The weighted averaging comprises weighting the first image element with a first weight and weighting the second image element with a second weight, wherein the first weight and the second weight are dependent on the first noise variance, the second noise variance, and the joint noise covariance. The image element combining unit 13 chooses the first weight and the second weight such that a combined noise value, in this embodiment, a combined noise variance, of the combined image element is reduced in comparison to at least one of the first noise variance and the second noise variance. Also for the case where the noise determination unit 13 is adapted to determine a joint noise covariance for the first image element and the second image element a more detailed description of how the weighted averaging is performed will be given below.

At least the combined image generated by the calculation unit 10 is provided to a display unit 11 for displaying the generated image.

Figure 2:
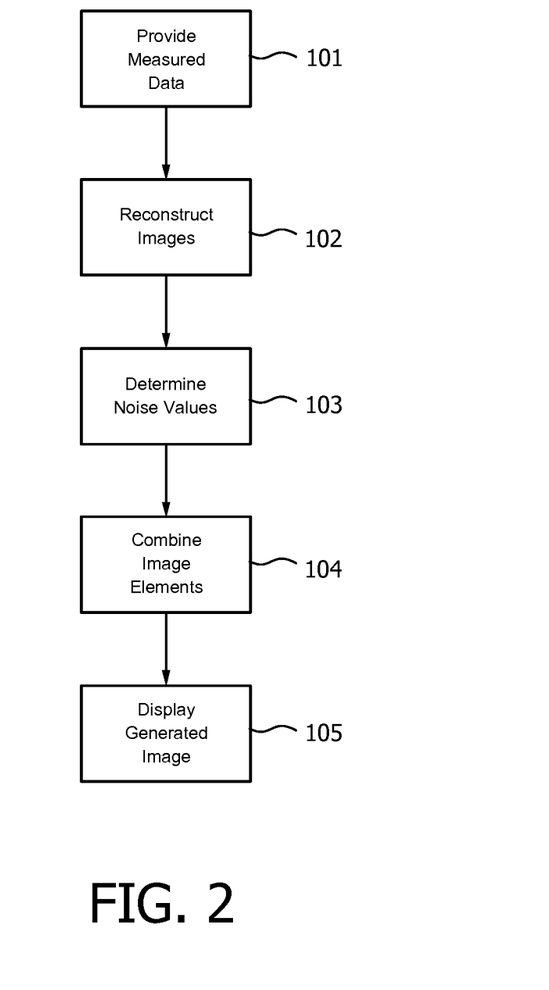
FIG. 2 shows a flowchart exemplarily illustrating an embodiment of an image generation method for generating an image of a region of interest.

In the following, an embodiment of an image generation method for generating an image of a region of interest will be described with reference to a flowchart shown in FIG. 2.

The image generation method for generating an image of a region of interest is, in this embodiment, a computed tomography (CT) method.

In step 101, the radiation source 2 rotates around the axis of rotation or the z axis and the object is not moved, that is, the radiation source 2 travels along a circular trajectory around the object. In another embodiment, the radiation source 2 can move along another trajectory, for example, a helical trajectory relative to the object. The radiation source 2 emits radiation, in this embodiment, X-ray radiation, traversing the object, which is present in the examination zone 5. The object is, for example, a human patient who is arranged on a patient table in the examination zone 5. The radiation, which has traversed the object, is detected by the detection device 6, which generates measured data of the region of interest.

The measured data of the region of interest, which are, in this embodiment, measured projection data, are provided to the calculation unit 10 and, in step 102, the reconstruction unit 12 reconstructs a first image $I_1$ of the region of interest from the measured data using a first reconstruction method and a second image $I_2$ of the region of interest from the measured data using a second reconstruction method. In this embodiment, the first reconstruction method is a filtered backprojection method and the second reconstruction method is an iterative penalized-likelihood method.

Filtered backprojection methods are well-known in the art as the most commonly used methods for image reconstruction in computed tomography (CT). Such methods are discussed, for example, in K. Stierstorfer, et al.: "Weighted FBP—A Simple Approximate 3D FBP Algorithm for Multi-slice Spiral CT with Good Dose Usage for Arbitrary Pitch", Physics in Medicine and Biology, 49(11):2209-2218, 2004 or in G. Shechter, et al.: "The Frequency Split Method for Helical Cone-Beam Reconstruction", Medical Physics, 31(8): 2230-2236, 2004.

Figure 3:
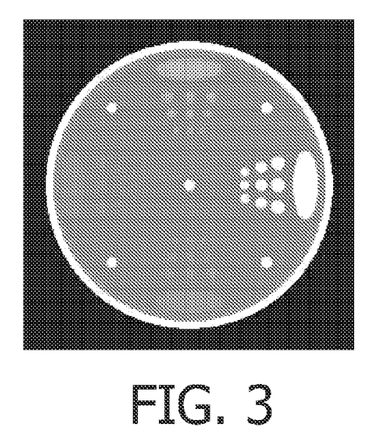
FIG. 3 shows schematically and exemplarily an object to be reconstructed.
Figure 4:
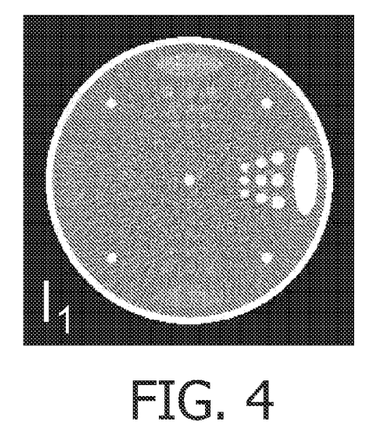
FIG. 4 shows schematically and exemplarily a first image of the object shown in FIG. 3, which has been reconstructed using a filtered backprojection method.

FIG. 4 shows schematically and exemplarily a first image $I_1$ of an object shown in FIG. 3, which has been reconstructed from noisy measurement values using a filtered backprojection method. The first image $I_1$ contains a comparably large amount of noise in the reconstruction of the object shown in FIG. 3.

A preferred reconstruction of the second image $I_2$ of the region of interest from the measured data using an iterative penalized-likelihood method will be described in more detail in the following:

Iterative penalized-likelihood methods are one example of reconstruction methods belonging to the more general class of statistical reconstruction methods. Such methods are discussed, for example, in S. Ahn, et al.: "Convergent Incremental Optimization Transfer Algorithms Application to Tomography", IEEE Transactions on Medical Imaging, 25(3):283-296, 2006, in WO 02/067201 A1 to I. A. Elbakri and J. A. Fessler, or in US 2006/0215891 A1 to J. A. Fessler and J. Hsieh. Compared to analytical reconstruction methods, such as a filtered backprojection method, statistical reconstruction methods have several attractive features. For example, they account for the statistics of the measured data in the reconstruction process and may therefore lead to more accurate estimates with lower noise values, in particular, with a lower noise variance. Moreover, they can easily incorporate system parameters such as the system geometry, detector responses, object constraints and any prior knowledge.

The iterative penalized-likelihood method described in the following is based on the assumption of a Poisson statistical model for (monoenergetic) transmission measurements:

$$y_i \sim \text{Poisson}\{b_i e^{-[A\mu]_i} + r_i\}, i=1, \ldots, N, \quad (1)$$

wherein $y_i$ denotes the transmission measurement value of the ith detector, $b_i$ denotes the blank scan counts of the ith detector, $r_i$ denotes the mean number of background counts of the ith detector, and $[A\mu]_i = \Sigma_{k=1}^P a_{ik}\mu_k$ is the ith line integral of the attenuation map in which $\mu_k$ is the unknown attenuation coefficient in the kth image element. $A = \{a_{ik}\}$ is the system matrix, which accounts for the system geometry as well as any other significant physical effects such as detector response, and N and p are the number of detectors and image elements, respectively. It is assumed that the $y_i$ 's are independent and that $b_i$, $r_i$, and $\{a_{ik}\}$ are known non-negative constants.

To find a statistical estimate $\hat{\mu}$ for the attenuation coefficient vector $\mu$ that is anatomically reasonable, a likelihood-based estimation approach is used. This is a natural choice since the likelihood is based on the statistical properties of the estimation problem. The maximum-likelihood approach also has good theoretical properties. It is asymptotically consistent, unbiased and efficient. The Poisson log-likelihood for independent (monoenergetic) transmission measurements is given by:

$$L(\mu) = \sum_{i=1}^N \{y_i \log(b_i e^{-[A\mu]_i} + r_i) - (b_i e^{-[A\mu]_i} + r_i)\}, \quad (2)$$

ignoring any constant terms.

Without regularization, the maximum-likelihood approach leads to a noisy reconstruction. One way to reduce such noise is to stop the iteration when the reconstructed image is visually appealing. Another approach is to pre-filter the measured data or to post-filter the reconstructed image. In this embodiment, however, a regularization (penalized-likelihood) approach is used for noise reduction. Such a regularization approach has several advantages. For example, the penalty function—also called 'roughness penalty' or 'regularization term'—improves the conditioning of the estimation problem. Moreover, one can choose penalty functions with certain desirable properties such as a good preservation of edges.

The most commonly used penalty functions penalize differences in the neighborhood of any particular image element. They are expressed as:

$$R(\mu) = \sum_{k=1}^P \sum_{l \in N_k} w_{kl} \psi(\mu_k - \mu_l), \quad (3)$$

wherein the function $\psi$ is a potential function that is generally symmetric, convex, non-negative and differentiable. The weights $w_{kl}$ are typically 1 for orthogonal image elements and $1/\sqrt{2}$ for diagonal image elements and $N_k$ is the neighborhood of the kth image element.

A common penalty function is the quadratic function $\psi(t) = t^2/2$. This penalty function is quite effective for noise reduction and is analytically simple, but may cause loss of detail and blurring, especially at edges, in the reconstructed image as a result of the quadratic rise of the function. To preserve the detail and edges, a penalty function can be used that provides a comparably smaller penalty for larger differences. One such penalty function is the hyperbola function:

$$\psi(t;\delta) = \sqrt{(1+(t/\delta)^2)}, \quad (4)$$

wherein the user selectable regularization parameter $\delta$ controls the contrast above which edges are preserved.

An alternative penalty function that is preferentially used in this embodiment is the Huber penalty function:

$$\psi(t;\delta) = \begin{cases} t^2/2, & t < \delta \\ \delta|t| - \delta^2/2, & t \geq \delta, \end{cases} \quad (5)$$

wherein the user selectable regularization parameter $\delta$ also controls the contrast above which edges are preserved.

Combining the maximum-likelihood objective function of equation (2) with the penalty function of equation (3) gives a so-called penalized-likelihood objective function:

$$\Gamma(\mu) = L(\mu) - \beta R(\mu). \quad (6)$$

The first term on the right in equation (6) forces the estimator to match the measured data. The second term imposes some degree of smoothness, leading to visually appealing images. The scalar parameter $\beta$ controls the tradeoff between the two terms (or, alternatively, the tradeoff between resolution and noise).

The goal of the iterative penalized-likelihood reconstruction then becomes to maximize equation (6) subject to certain object constraints such as non-negativity:

$$\hat{\mu} = \underset{\mu \geq 0}{\text{argmax}}\, \Gamma(\mu). \quad (7)$$

The Poisson log-likelihood of equation (2) is known to be convex and the same holds true for the two exemplary penalty functions of equation (4) and equation (5). Therefore, it is known that equation (7) has a unique solution. This unique solution can be found numerically using, for example, a so-called separable paraboloid surrogate (SPS) method. Such a method is discussed, for example, in H. Erdogan and J. A. Fessler: "Ordered Subsets Algorithms for Transmission Tomography", Physics in Medicine and Biology, 44(11): 2835-2851, 1998 or in J. A. Fessler and H. Erdogan: "A Paraboloidal Surrogates Algorithm for Convergent Penalized-Likelihood Emission Image Reconstruction", in Proc. of IEEE Nuc. Sci. Symp. Med. Im. Conf., 1998, which are herewith incorporated by reference. In a separable paraboloid surrogate (SPS) method, a separable quadratic function, the so-called surrogate, is fitted to a current estimate of the image and the surrogate function is optimized, leading to an improved estimate of the reconstructed image that maximizes equation (7). By iteratively repeating this fitting and optimizing of the surrogate function, the reconstructed image that maximizes equation (7) is determined numerically.

Figure 5:
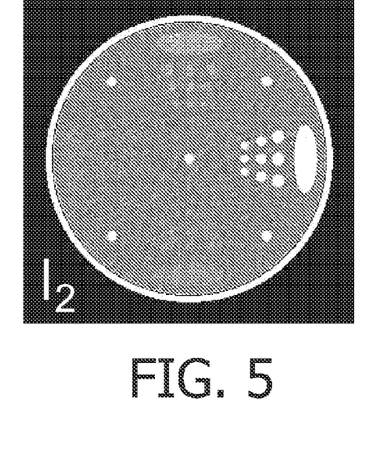
FIG. 5 shows schematically and exemplarily a second image of the object shown in FIG. 3, which has been reconstructed using an iterative penalized-likelihood method.

FIG. 5 shows schematically and exemplarily a second image $I_2$ of the object shown in FIG. 3, which has been reconstructed from noisy measurement values using the iterative penalized-likelihood method. Compared to the first image $I_1$ show in FIG. 4, the second image $I_2$ shown in FIG. 5 contains a comparably lower amount of noise in the reconstruction of the object shown in FIG. 3.

Referring again to FIG. 2, in step 103, the noise determination unit 13 determines first noise values $n_1$ for first image elements $i_1$ of the first image $I_1$ and second noise values $n_2$ for second image elements $i_2$ of the second image $I_2$. In this embodiment, the noise determination unit 13 determines the first noise value $n_1$ for a first image element $i_1$ of the first image elements $i_1$ as a first noise variance $\sigma_1^2$ of the first image element $i_1$ and the second noise value $n_2$ for a second image element $i_2$ of the second image elements $i_2$ as a second noise variance $\sigma_2^2$ of the second image element $i_2$. The noise determination unit 13 determines the first noise variance $\sigma_1^2$ for the first image element $i_1$ based on knowledge about the first reconstruction method, which, in this embodiment, is a filtered backprojection method, and the second noise variance $\sigma_2^2$ for the second image element $i_2$ based on knowledge about the second reconstruction method, which, in this embodiment, is an iterative penalized-likelihood method.

The determination of the first noise variance $\sigma_1^2$ the first image element $i_1$ based on knowledge about the filtered backprojection method is known, for example, from A. Wunderlich and F. Noo: "Image Covariance and Lesion Detectability in Direct Fan-Beam X-Ray Computed Tomography", Physics in Medicine and Biology, 53(10):2471-2493, 2008, which is herewith incorporated by reference. This determination of the first noise variances is based on the well-known insight that the noise variance of the weighted average of two random variables X and Y results to:

$$\text{Var}(aX+bY) = a^2 \text{Var}(X) + b^2 \text{Var}(Y), \quad (8)$$

wherein a and b are real numbers. Since a filtered backprojection method is a linear reconstruction method, all processing steps, that is, for example, filtering, interpolation, or backprojection, are linear operations and the reconstructed attenuation coefficients A are linear combinations of the measured data. The noise variance is therefore determined from the measured data based on equation (8). For a more detailed description of this known method for determining the noise variance reference is made to the above mentioned article by A. Wunderlich and F. Noo.

Figure 6:
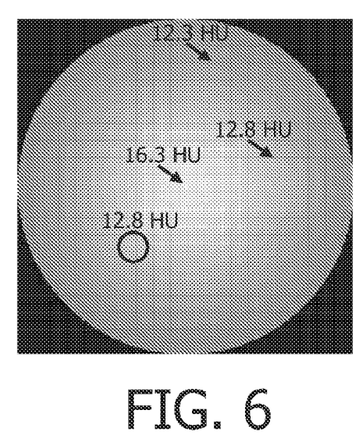
FIG. 6 shows schematically and exemplarily an image illustrating the square roots of first noise variances, which have been determined for first image elements of the first image shown in FIG. 4.

FIG. 6 shows schematically and exemplarily an image illustrating the square roots of first noise variances $\sigma_1^2$, which have been determined for first image elements $i_1$ of the first image $I_1$ shown in FIG. 4. In this image, an arrow identifies an exemplary first image element $i_1$ and the numerical value next to the arrow represents the square root of the first noise variance $\sigma_1^2$ of that exemplary image element $i_1$. Likewise, the circle identifies an exemplary region of first image elements $i_1$ and the numerical value next to the circle represents the mean value of the square roots of the first noise variances $\sigma_1^2$ of the first image elements $i_1$ of that confined region. The image shown in FIG. 6 illustrates that the first noise variances $\sigma_1^2$ vary spatially within the first image $I_1$ shown in FIG. 4. However, within a confined region of the first image $I_1$ shown in FIG. 4, for example, within the exemplary region of image elements $i_1$ represented by the circle, the first noise variances $\sigma_1^2$ do not vary considerably.

A preferred way of determining the second noise variance $\sigma_2^2$ for the second image element $i_2$ based on knowledge about the iterative penalized-likelihood method will be described in more detail in the following.

The determination of the second noise variances is known from, for example, US 2006/0215891 A1 to J. A. Fessler and J. Hsieh, which is herewith incorporated by reference. This determination of the second noise variances is based on the following approximation of the covariance of the reconstructed attenuation coefficient vector $\hat{\mu}$:

$$\text{Cov}\{\hat{\mu}\} \approx [\nabla^2 \Gamma(\mu)]^{-1} \text{Cov}\{\nabla \Gamma(\mu)\} [\nabla^2 \Gamma(\mu)]^{-1}, \quad (9)$$

wherein $\nabla \Gamma(\mu)$ is the gradient of the penalized-likelihood objective function of equation (6) and $\nabla^2 \Gamma(\mu)$ is its Hessian. The above equation is used to compute diagonal elements of the covariance matrix $\text{Cov}\{\hat{\mu}\}$, wherein the diagonal elements of the covariance matrix $\text{Cov}\{\hat{\mu}\}$ are estimates of the noise variance of each image element. For a more detailed description of this known determination of the second noise variances reference is made to the previously mentioned US 2006/0215891 A1.

Alternatively, the noise variances of the image elements of the reconstructed image can be determined using other methods. In particular, if the iterative penalized-likelihood method uses a penalty function such as is defined in equation (4) and equation (5), the noise variance of image elements whose spatial variation is below the user selectable regularization parameter $\delta$ may be determined as discussed, for example, in Y. Zhang-O'Connor and J. A. Fessler: "Fast Predictions of Variance Images for Fan-Beam Transmission Tomography With Quadratic Regularization", IEEE Transactions on Medical Imaging, 26(3):335-346, 2007. The noise variance of image elements whose spatial variation is above the user selectable regularization parameter $\delta$ may then be determined as discussed, for example, in J. Qi and R. M. Leahy: "A Theoretical Study of the Contrast Recovery and Variance of MAP Reconstruction from PET Data", IEEE Transactions on Medical Imaging, 18(4):293-305, 1999 or in J. W. Stayman and J. A. Fessler: "Efficient Calculation of Resolution and Covariance for Penalized-Likelihood Reconstruction in Fully 3-D SPECT", IEEE Transactions on Medical Imaging, 23(12):1543-1556, 2004.

Figure 7:
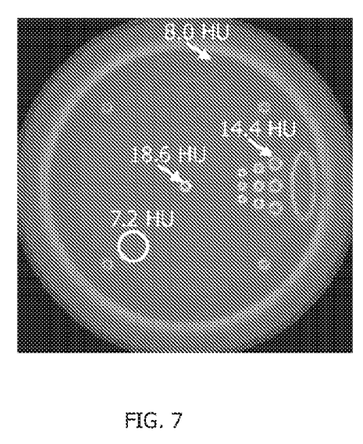
FIG. 7 shows schematically and exemplarily an image illustrating the square roots of second noise variances, which have been determined for second image elements of the second image shown in FIG. 5.

FIG. 7 shows schematically and exemplarily an image illustrating the square roots of second noise variances $\sigma_2^2$, which have been determined for second image elements $i_2$ of the second image $I_2$ shown in FIG. 5. The image shown in FIG. 7 illustrates that the second noise variances $\sigma_2^2$ vary spatially within the second image $I_2$ shown in FIG. 5. Compared to the first noise variances $\sigma_1^2$ of the first image $I_1$ shown in FIG. 4, the second noise variance $\sigma_2^2$ of the first image $I_2$ shown in FIG. 5 are lower in homogeneous regions of the object shown in FIG. 3 and higher in regions of sharp edges of the object shown in FIG. 3.

Referring back to FIG. 2, in step 103, the noise determination unit 13 optionally determines joint third noise values $n_{1,2}$ for the first image elements $i_1$ and the second image elements $i_2$. In this embodiment, the noise determination unit 13 determines the joint third noise value $n_{1,2}$ for the first image element $i_1$ and the second image element $i_2$ as a joint noise covariance $\sigma_{1,2}$ of the first image element $i_1$ and the second image element $i_2$. The noise determination unit 13 determines the joint noise covariance $\sigma_{1,2}$ for the first image element $i_1$ and the second image element $i_2$ based on knowledge about the first reconstruction method, which, in this embodiment, is a filtered-backprojection method, and the second reconstruction method, which, in this embodiment, is an iterative penalized-likelihood method.

A suitable way of determining the joint noise covariance $\sigma_{1,2}$ for the first image element $i_1$ and the second image element $i_2$ based on knowledge about the first reconstruction method, which, in this embodiment, is a filtered backprojection method, and the second reconstruction method, which, in this embodiment, is an iterative penalized-likelihood method, will be described in more detail in the following.

If two images are differently reconstructed from the same measured data using a first and a second reconstruction method, it can be expected that the noise values of corresponding image elements of the two differently reconstructed images exhibit a significant degree of joint noise correlation. The joint noise covariances $\sigma_{1,2}$, which are related to the joint noise correlations of a first image element and a corresponding second image element by the relation $r_{1,2}=\sigma_{1,2}/\sqrt{\sigma_1^2 \cdot \sigma_2^2}$, wherein $r_{1,2}$ represents the joint noise correlation, may then be determined, for example, on the basis of a heuristical estimation. In other words, simulations can be performed for typical objects that are to be reconstructed using the first reconstruction method and the second reconstruction method. Based on such simulations, typical joint noise correlations $r_{1,2}$ can be determined for different regions (homogeneous regions, high activity regions, such as sharp edges, corners, et cetera) of an object. For example, different sets of measured data can be simulated with different noise. The noise is preferentially chosen such that it describes the noise of the measuring process performed by the image generation system. The noise is, for example, a Poisson noise or another noise. For each set of simulated measured data a first image can be reconstructed by using the first reconstruction method and a second image can be reconstructed by using the second reconstruction method. That means several first image elements and several corresponding second image elements are reconstructed based on the different sets of simulated measured data. The image values of the several first image elements and the image values of the several second image elements form two sequences. In an embodiment, the joint noise correlation can be determined as the correlation between these two sequences. From the determined typical joint noise correlations $r_{1,2}$, the related joint covariance values $\sigma_{1,2}$ can then be determined for two differently reconstructed images of an object by further determining the first noise variances $\sigma_1^2$ and the second noise variances $\sigma_2^2$ as described above.

Figure 8:
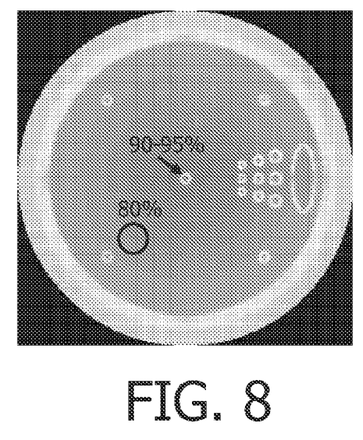
FIG. 8 shows schematically and exemplarily an image illustrating joint noise correlations related to joint noise covariances, which have been determined for first image elements of the first image shown in FIG. 4 and second image elements of the second image shown in FIG. 5.

FIG. 8 shows schematically and exemplary an image illustrating joint noise correlations related to joint noise covariances $\sigma_{1,2}$, which have been determined for first image elements $i_1$ of the first image $I_1$ show in FIG. 4 and second image elements $i_2$ of the second image $I_2$ shown in FIG. 5. The image shown in FIG. 8 illustrates that the noise in the first image $I_1$ shown in FIG. 4 and the noise in the second image $I_2$ shown in FIG. 5 is highly correlated, in particular, in regions of sharp edges of the object shown in FIG. 3.

Referring back to FIG. 2, in step 104, the image element combining unit 14 combines the first image elements $i_1$ and the second image elements $i_2$ into combined image elements $i_C$ forming a combined image $I_C$.

In more detail, if, in step 103, a joint noise covariance $\sigma_{1,2}$ for the first image element $i_1$ and the second image element $i_2$ has not been determined, the image element combination unit 14 combines a first image element $i_1$ of the first image elements $i_1$ and a corresponding second image element $i_2$ of the second image elements $i_2$ into a combined image element $i_C$ of the combined image elements $i_C$ based on the first noise variance $\sigma_1^2$ determined for the first image element $i_1$ and the second noise variance $\sigma_2^2$ determined for the second image element $i_2$. In this embodiment, the image element combining unit 14 combines the first image element $i_1$ and the second image element $i_2$ by performing a weighted averaging. The weighted averaging comprises weighting the first image element $i_1$ with a first weight $w_1$ and weighting the second image element $i_2$ with a second weight $w_2$. The first weight $w_1$ and the second weight $w_2$ are dependent on the first noise variance $\sigma_1^2$ and the second noise variance $\sigma_2^2$. The image element combining unit 14 chooses the first weight $w_1$ and the second weight $w_2$ such that a combined noise value $n_C$, in particular, a combined noise variance $\sigma_C^2$ of the combined image element $i_C$ is reduced in comparison to at least one of the first noise variance $\sigma_1^2$ and the second noise variance $\sigma_2^2$. In this embodiment, the first weight $w_1$ and the second weight $w_2$ are chosen such that the combined noise variance $\sigma_C^2$ is smaller than both the first noise variance $\sigma_1^2$ and the second noise variance $\sigma_2^2$. In particular, the first weight $w_1$ and the second weight $w_2$ are chosen such that the combined noise variance $\sigma_C^2$ is minimized.

A preferred way of choosing the first weight $w_1$ and the second weight $w_2$ such that the combined noise variance $\sigma_C^2$ is minimized will be described in the following for the case where, in step 103, a joint noise covariance $\sigma_{1,2}$ for the first image element $i_1$ and the second image element $i_2$ has not been determined.

In this case, the combined noise variance $\sigma_C^2$ the combined image element $i_C$ can be determined from the following relation:

$$\sigma_C^2 = \mathrm{Var}(w_1 \hat{\mu}_1 + w_2 \hat{\mu}_2) = w_1^2 \sigma_1^2 + w_2^2 \sigma_2^2, \qquad (10)$$

wherein $\hat{\mu}_1$ is the reconstructed attenuation coefficient of the first image element $i_1$ and $\hat{\mu}_2$ is the reconstructed attenuation coefficient of the second image element $i_2$.

Assuming that both the first image $I_1$ and the second image $I_2$ are bias-free, the weights should sum up to 1. The minimization of equation (10) then leads to a quadratic equation in either the first weight $w_1$ or the second weight $w_2$, for example:

$$\frac{\partial}{\partial w_1}(w_1^2 \sigma_1^2 + (1-w_1)^2 \sigma_2^2) = 0. \qquad (11)$$

The "optimal" weights, that is, the weights that minimize the combined noise variance $\sigma_C^2$ of the combined image element $i_C$ then result to:

$$w_1 = \frac{\sigma_2^2}{\sigma_1^2 + \sigma_2^2}, \text{ and } w_2 = \frac{\sigma_1^2}{\sigma_1^2 + \sigma_2^2}. \qquad (12)$$

Thus, in the case where, in step 103, a joint noise covariance $\sigma_{1,2}$ for the first image element $i_1$ and the second image element $i_2$ has not been determined, the image element combining unit 14 preferentially chooses the first weight $w_1$ and the second weight $w_2$ according to equation (12).

Alternatively, if, in step 103, a joint noise covariance $\sigma_{1,2}$ for the first image element $i_1$ and the second image element $i_2$ has been determined, the image element combination unit 14 combines a first image element $i_1$ of the first image elements $i_1$ and a corresponding second image element $i_2$ of the second image elements $i_2$ into a combined image element $i_C$ of the combined image elements $i_C$ based on the first noise variance $\sigma_1^2$ determined for the first image element $i_1$, the second noise variance $\sigma_2^2$ determined for the second image element $i_2$, and the joint noise covariance $\sigma_{1,2}$ determined for the first image element $i_1$ and the second image element $i_2$. In this embodiment, the image element combining unit 14 combines the first image element $i_1$ and the second image element $i_2$ by performing a weighted averaging. The weighted averaging comprises weighting the first image element $i_1$ with a first weight $w_1$ and weighting the second image element $i_2$ with a second weight $w_2$. The first weight $w_1$ and the second weight $w_2$ are dependent on the first noise variance $\sigma_1^2$, the second noise variance $\sigma_2^2$, and the joint noise covariance $\sigma_{1,2}$. The image element combining unit 14 chooses the first weight $w_1$ and the second weight $w_2$ such that a combined noise value $n_C$, in particular, a combined noise variance $\sigma_C^2$ of the combined image element $i_C$ is reduced in comparison to at least one of the first noise variance $\sigma_1^2$ and the second noise variance $\sigma_2^2$. In this embodiment, the first weight $w_1$ and the second weight $w_2$ are chosen such that the combined noise variance $\sigma_C^2$ is smaller than both the first noise variance $\sigma_1^2$ and the second noise variance $\sigma_2^2$. In particular, the first weight $w_1$ and the second weight $w_2$ are chosen such that the combined noise variance $\sigma_C^2$ is minimized.

A preferred way of choosing the first weight $w_1$ and the second weight $w_2$ such that the combined noise variance $\sigma_C^2$ is minimized will be described in the following for the case where, in step 103, a joint noise covariance $\sigma_{1,2}$ for the first image element $i_1$ and the second image element $i_2$ has been determined.

In this case, the combined noise variance $\sigma_C^2$ of the combined image element $i_C$ can be determined from the following relation:

$$\sigma_C^2 = \text{Var}(w_1\hat{\mu}_1 + w_2\hat{\mu}_2) = w_1^2\sigma_1^2 + 2w_1w_2\sigma_{1,2} + w_2^2\sigma_2^2, \quad (13)$$

wherein $\hat{\mu}_1$ is the reconstructed attenuation coefficient of the first image element $i_1$ and $\hat{\mu}_2$ is the reconstructed attenuation coefficient of the second image element $i_2$.

Assuming that both the first image $I_1$ and the second image $I_2$ are bias-free, the weights should sum up to 1. The minimization of equation (13) then leads to a quadratic equation in either the first weight $w_1$ or the second weight $w_2$, for example:

$$\frac{\partial}{\partial w_1}(w_1^2\sigma_1^2 + 2w_1(1-w_1)\sigma_{1,2} + (1-w_1)^2\sigma_2^2) = 0. \quad (14)$$

The "optimal" weights, that is, the weights that minimize the combined noise variance $\sigma_C^2$ of the combined image element $i_C$ then result to:

$$w_1 = \frac{\sigma_2^2 - \sigma_{1,2}}{\sigma_1^2 - 2\sigma_{12} + \sigma_2^2}, \text{ and } w_2 = \frac{\sigma_1^2 - \sigma_{1,2}}{\sigma_1^2 - 2\sigma_{12} + \sigma_2^2}. \quad (15)$$

Thus, in the case where, in step 103, a joint noise covariance $\sigma_{1,2}$ for the first image element $i_1$ and the second image element $i_2$ has been determined, the image element combining unit 14 preferentially chooses the first weight $w_1$ and the second weight $w_2$ according to equation (15).

Figure 9:
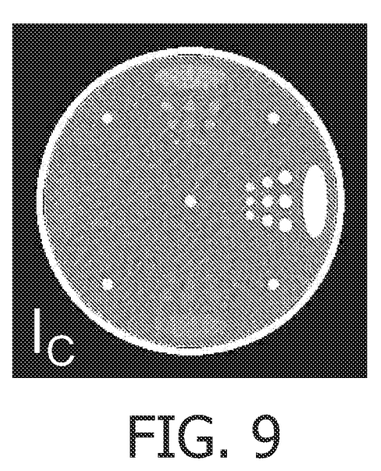
FIG. 9 shows schematically and exemplarily a combined image of the object shown in FIG. 3, which has been generated by suitably combining the first image shown in FIG. 4 and the second image shown in FIG. 5

FIG. 9 shows an schematically and exemplarily a combined image $I_C$ of the object shown in FIG. 3, which has been generated by suitably combining the first image $I_1$ shown in FIG. 4 and the second image $I_2$ shown in FIG. 5.

Figure 10:
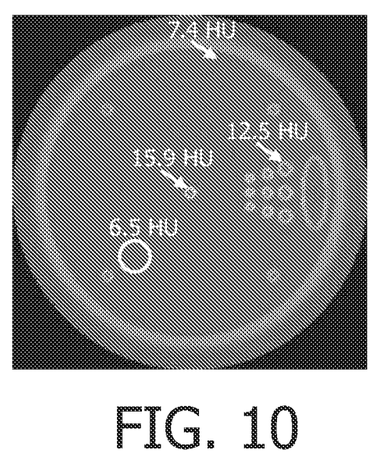
FIG. 10 shows schematically and exemplarily an image illustrating the square roots of combined noise variances of combined image elements of the combined image shown in FIG. 9.

FIG. 10 shows schematically and exemplarily an illustration of the square roots of combined noise variances $\sigma_C^2$ of combined image elements $i_C$ of the combined image $I_C$ shown in FIG. 9. Compared the first noise variances $\sigma_1^2$ of the first image $I_1$ shown in FIG. 4 and the second noise variances $\sigma_2^2$ of the second image $I_2$ shown in FIG. 5, the combined noise variances $\sigma_C^2$ of the combined image $I_C$ shows in FIG. 9 are reduced in both homogeneous regions of the object shown in FIG. 3 and in high activity regions, such as sharp edges, corners, etc., of the object shown in FIG. 3.

Referring back to FIG. 2, in step 105, at least the combined image $I_C$ generated by the calculation unit 10 is provided to a display unit 11 for displaying the generated image $I_C$.

Although in the above described embodiments measured projection data are provided by elements of a computed tomography system being a measured data providing unit, also other imaging systems can be used as measured data providing unit, for example, magnetic resonance imaging systems, ultrasound imaging systems or nuclear imaging systems. Furthermore, the measured data providing unit can also be a data storage unit, on which measured data are already stored or a data connection via which measured data can be received. The measured data providing unit can also be a simulation unit, for example, a computer system, on which a generation of measured data is simulated.

Although in the above described embodiments, a first noise variance has been determined as the first noise value of a first image element and a second noise variance has been determined as the second noise value of a second image element, in other embodiments, other types of noise values, for example, noise mean values or parameters of parametric noise probability distributions, may be determined as the first noise value and the second noise value. Likewise, in the above described embodiments, a joint noise covariance has been determined as the joint third noise value of a first and second image element. In other embodiment, however, another type of noise value, for example, a joint noise mean value or a parameter of a parametric joint noise probability distribution may be determined as the joint third noise value.

In the above described embodiments, the first reconstruction method is a filtered backprojection method and the second reconstruction method is an iterative penalized-likelihood method. In other embodiments, the first and the second reconstruction method can also be other reconstruction methods. For example, the first reconstruction method can be an algebraic reconstruction method or it can also be a statistical reconstruction method. Likewise, the second reconstruction method can be, for example, an algebraic reconstruction method or it can be another statistical reconstruction method, such as an iterative maximum-likelihood method without regularization. The first and the second reconstruction method can also be both statistical reconstruction methods, for example, they can both be iterative penalized-likelihood methods, but they may incorporate a different 'roughness penalty' for regularizing the reconstruction. In principle, the first and the second reconstruction methods can be any reconstruction methods that lead to reconstructed images that are, at least in parts, differently reconstructed.

While the "optimal" weights in equation (12) and equation (15) have been derived in the above described embodiments for the case where the first and second noise values have been determined as a first and second noise variance and the joint third noise value has been determined as a joint noise covariance, these equations can also be used when other types of noise values, for example, mean noise values, et cetera, have been determined as the first, second and joint third noise value, respectively.

In equations (12) and (15) the first weight and the second weight are determined as being equal to the expressions shown on the right side of the respective equal sign, in other embodiments the first weight and the second weight can be a function of the respective expressions, for example, they can be proportional to the respective expressions.

Other variations to the disclosed embodiments can be understood and effected by those skilled in the art in practicing the claimed invention, from a study of the drawings, the disclosure, and the appended claims.

In the claims, the word "comprising" does not exclude other elements or steps, and the indefinite article "a" or "an" does not exclude a plurality.

A single unit or device may fulfill the functions of several items recited in the claims. The mere fact that certain measures are recited in mutually different dependent claims does not indicate that a combination of these measures cannot be used to advantage.

Calculations, such as the reconstruction of images or the determination of noise values, performed by one or several units or devices, can be determined by any number of units or devices. For example, the steps 102 and 103 of the above described method for generating an image of a region of interest can be performed by two separate units, or they can be performed by only a single, common unit or they can be performed by any other number of different units.

A computer program may be stored/distributed on a suitable medium, such as an optical storage medium or a solid-state medium, supplied together with or as part of other hardware, but may also be distributed in other forms, such as via the Internet or other wired or wireless telecommunication systems.

Any reference signs in the claims should not be construed as limiting the scope.

The invention relates to an image generation system for generating an image of a region of interest. The image generation system comprises a measured data providing unit for providing measured data of the region of interest, a reconstruction unit for reconstructing a first and a second image of the region of interest from the measured data using a first and a second reconstruction method, a noise determination unit for determining first and second noise values for first and second image elements of the first and second image, and an image element combining unit for combining corresponding first and second image elements into combined image elements forming a combined image based on the first and second noise values. By combining corresponding image elements of two differently reconstructed images based on determined noise values, a combined image of a region of interest can be generated with an improved quality.

The invention claimed is:

1. An image generation system for generating an image of a region of interest, the image generation system comprising:
a measured data providing unit for providing measured data of the region of interest for generating an image of the region of interest,
a reconstruction unit for reconstructing a first image ($I_1$) of the region of interest from the measured data using a first reconstruction method and a second image ($I_2$) of the region of interest from the measured data using a second reconstruction method,
a noise determination unit for determining first noise values ($n_1$) for first image elements ($i_1$) of the first image ($I_1$) and second noise values ($n_2$) for second image elements ($i_2$) of the second image ($I_2$), and
an image element combining unit for combining the first image elements ($i_1$) and the second image elements ($i_2$) into combined image elements ($i_C$) forming a combined image ($I_c$),
wherein the noise determination unit determines joint third noise values ($n_{1,2}$) for the first image elements ($i_1$) and the second image elements ($i_2$), and wherein the image element combining unit combines a first image element ($i_1$) of the first image elements ($i_1$) and a corresponding second image element ($i_2$) of the second image elements ($i_2$) based on the first noise value ($n_1$) determined for the first image element ($i_1$), the second noise value ($n_2$) determined for the second image element ($i_2$) and the joint third noise value ($n_{1,2}$) determined for the first image element ($i_1$) and the second image element ($i_2$).

2. The image generation system as defined in claim 1, wherein the noise determination unit determines the first noise value ($n_1$) for the first image element ($i_1$) as a first noise variance ($\sigma_1^2$) of the first image element ($i_1$) and the second noise value ($n_2$) for the second image element ($i_2$) as a second noise variance ($\sigma_2^2$) of the second image element ($i_2$).

3. The image generation system as defined in claim 1, wherein the noise determination unit determines the first noise value ($n_1$) for the first image element ($i_1$) based on knowledge about the first reconstruction method and the second noise value ($n_2$) for the second image element ($i_2$) based on knowledge about the second reconstruction method.

4. The image generation system as defined in claim 1, wherein the image element combining unit combines the first image element ($i_1$) and the second image element ($i_2$) by performing a weighted averaging, wherein the weighted averaging comprises weighting the first image element ($i_1$) with a first weight ($w_1$) and weighting the second image element ($i_2$) with a second weight ($w_2$), and wherein the first weight ($w_1$) and the second weight ($w_2$) are dependent on the first noise value ($n_1$) and the second noise value ($n_2$).

5. The image generation system as defined in claim 4, wherein the image element combining unit chooses the first weight ($w_1$) and the second weight ($w_2$) such that a combined noise value ($n_C$) of the combined image element ($i_C$) is reduced in comparison to at least one of the first noise value ($n_1$) and the second noise value ($n_2$).

6. The image generation system as defined in claim 5, wherein the image element combining unit chooses
the first weight ($w_1$) depending on a ratio of a) the second noise value ($n_2$) and b) the sum of the first noise value ($n_1$) and the second noise value ($n_2$), and
the second weight ($w_2$) depending on a ration of a) the first noise value ($n_1$) and b) the sum of the first noise value ($n_1$) and the second noise value ($n_2$).

7. The image generation system as defined in claim 1, wherein the noise determination unit determines the joint third noise value ($n_{1,2}$) for the first image element ($i_1$) and the second image element ($i_2$) as a joint noise covariance ($\sigma_{1,2}$) of the first image element ($i_1$) and the second image element ($i_2$).

8. The image generation system as defined in claim 1, wherein the noise determination unit determines the joint third noise value ($n_{1,2}$) for the first image element ($i_1$) and the second image element ($i_2$) based on knowledge about the first reconstruction method and the second reconstruction method.

9. The image generation system as defined in claim 1, wherein the image element combining unit combines the first image element ($i_1$) and the second image element ($i_2$) by performing a weighted averaging, wherein the weighted averaging comprises weighting the first image element ($i_1$) with a first weight ($w_1$) and weighting the second image element ($i_2$) with a second weight ($w_2$), and wherein the first weight ($w_1$) and the second weight ($w_2$) are dependent on the first noise value ($n_1$), the second noise value ($n_2$) and the joint third noise value ($n_{12}$).

10. The image generation system as defined in claim 9, wherein the image element combining unit chooses the first weight ($w_1$) and the second weight ($w_2$) such that a combined noise value ($n_C$) of the combined image element ($i_C$) is reduced in comparison to at least one of the first noise value ($n_1$) and the second noise value ($n_2$).

11. The image generation system as defined in claim 10, wherein the image element combining unit chooses the first weight ($w_1$) depending on following expression:

$$\frac{n_2 - n_{1,2}}{n_1 - 2n_{1,2} + n_2},$$

and the second weight ($w_2$) depending on following expression:

$$\frac{n_1 - n_{1,2}}{n_1 - 2n_{1,2} + n_2},$$

wherein $n_1$ represents the first noise value, $n_2$ represents the second noise value and $n_{1,2}$ represents the joint third noise value.

12. The image generation system as defined in claim 1, wherein the first reconstruction method is a filtered back-projection method and the second reconstruction method is an iterative penalized-likelihood method.

13. An image generation method for generating an image of a region of interest, the image generation method comprising the following steps:

provided measured data of the region of interest for generating an image of the region of interest, reconstructing a first image ($I_1$) of the region of interest from the measured data using a first reconstruction method and a second image ($I_2$) of the region of interest from the measured data using a second reconstruction method, determining first noise values ($n_1$) for first image elements ($i_1$) of the first image ($I_1$), second noise values ($n_2$) for second image elements ($i_2$) of the second image ($I_2$), and joint third noise values ($n_{1,2}$) for the first image elements ($i_1$) and the second image elements ($i_2$), and combining the first image elements ($i_1$) and the second image elements ($i_2$) into combined image elements ($i_C$) forming a combined image ($I_C$), wherein a first image element ($i_1$) of the first image elements ($i_1$) and a corresponding second image element ($i_2$) of the second image elements ($i_2$) are combined based on the first noise value ($n_1$) determined for the first image element ($i_1$), the second noise value ($n_2$) determined for the second image element ($i_2$), and the joint third noise value ($n_{1,2}$) determined for the first image element ($i_1$) and the second image element ($i_2$).

14. A computer program on a non-transitory computer medium for generating an image of a region of interest, the computer program comprising program code means for causing an image generation system to carry out the steps of the image generation method as defined in claim 13.

* * * * *